(12) United States Patent
Nitta

(10) Patent No.: US 7,525,745 B2
(45) Date of Patent: Apr. 28, 2009

(54) MAGNETIC DISK DRIVE APPARATUS AND METHOD OF CONTROLLING THE SAME

(75) Inventor: Tatsuo Nitta, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 66 days.

(21) Appl. No.: 11/878,991

(22) Filed: Jul. 30, 2007

(65) Prior Publication Data

US 2008/0049354 A1 Feb. 28, 2008

(30) Foreign Application Priority Data

Jul. 31, 2006 (JP) ............................. 2006-209265

(51) Int. Cl.
*G11B 27/36* (2006.01)

(52) U.S. Cl. ........................ 360/31; 711/118
(58) Field of Classification Search ................. None
See application file for complete search history.

(56) References Cited

U.S. PATENT DOCUMENTS

| | | | | |
|---|---|---|---|---|
| 7,251,094 | B2 * | 7/2007 | Miyano | 360/75 |
| 7,362,535 | B2 * | 4/2008 | Kumano | 360/75 |
| 2006/0206681 | A1 * | 9/2006 | Suzuki et al. | 711/170 |
| 2006/0215307 | A1 * | 9/2006 | Yoshida et al. | 360/75 |
| 2007/0033362 | A1 * | 2/2007 | Sinclair | 711/165 |
| 2007/0050548 | A1 * | 3/2007 | Bali et al. | 711/118 |

FOREIGN PATENT DOCUMENTS

| | | |
|---|---|---|
| JP | 08-194583 | 7/1996 |
| JP | 2006-510979 | 3/2006 |
| JP | 2006-114206 | 4/2006 |

OTHER PUBLICATIONS

Obr et al.; "Non Volatile Cache Command Proposal for ATA8-ACS"; Nov. 17, 2005; Revison 5; pp. 1-22.

* cited by examiner

*Primary Examiner*—Jason C Olson
(74) *Attorney, Agent, or Firm*—Pillsbury Winthrop Shaw Pittman, LLP

(57) ABSTRACT

According to one embodiment, a magnetic disk drive apparatus includes a nonvolatile memory which serves as a cache memory when data is recorded in a magnetic disk which records data, a threshold value setting unit which sets a threshold value of a storable size of the nonvolatile memory in accordance with count of the shock detected by a detector which detects shock applied to a main body, calculator which calculates a sum of a size of data which has been written in the nonvolatile memory and a size of data to be written, determination section which determines whether or not the calculated data size is greater than the threshold value, moving unit which moves the data written in the nonvolatile memory to the magnetic disk, when it is determined that calculated data size is greater than the threshold value, and writing section which writs the data in the nonvolatile memory.

10 Claims, 4 Drawing Sheets

_US 7,525,745 B2_

MAGNETIC DISK DRIVE APPARATUS AND METHOD OF CONTROLLING THE SAME

CROSS-REFERENCE TO RELATED APPLICATIONS

This application is based upon and claims the benefit of priority from Japanese Patent Application No. 2006-209265, filed Jul. 31, 2006, the entire contents of which are incorporated herein by reference.

BACKGROUND

1. Field

One embodiment of the present invention relates to a magnetic disk drive apparatus such as a hard disk drive and a method of controlling the magnetic disk drive.

2. Description of the Related Art

Recently, a hard disk drive has become an information recording medium having large capacity with a high reliability and has been widespread in various fields as, for example, a medium for recording computer data, image data, audio data and the like. In addition, a hard disk has been so downsized as to be built in a potable electronic device.

For this reason, in a current downsizing-oriented magnetic disk drive using a hard disk, a speed of writing and reading information is made higher, a drive count of the hard disk, i.e. a write count of information in the hard disk and a read count of information therefrom are reduced, and the battery power is thereby saved, by using a nonvolatile memory capable of writing and reading information at a high speed as a cache memory.

In other words, this kind of magnetic disk drive urges a nonvolatile memory to write information to the outside and read information therefrom, and urges the hard disk to transfer information to the nonvolatile memory, thereby accelerating writing and reading operations of information as seen from the outside and reducing the drive count of the hard disk. This magnetic disk drive, also referred to as a NV (nonvolatile)-cache applicable HDD (hard disk drive), has been proposed (Non Volatile Cache Command Proposal for ATA 8—ACS Revision 5).

As described above, in the HDD including the nonvolatile memory as cache, resistance to shock caused by vibration and drop can be increased as the drive count of the hard disk can be reduced. However, when the memory usage rate (amount) of the nonvolatile memory is beyond a certain threshold value, the hard disk needs to be driven to flush the data stored in the nonvolatile memory and write data to the hard disk (disk medium). At this time, when a shock is given to the HDD, the head may collide with the disk medium.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a magnetic disk drive apparatus includes a nonvolatile memory which serves as a cache memory when data is recorded in a magnetic disk which records data, a threshold value setting unit which sets a threshold value of a storable size of the nonvolatile memory in accordance with count of the shock detected by a detector which detects shock applied to a main body, calculator which calculates a sum of a size of data which has been written in the nonvolatile memory and a size of data to be written, determination section which determines whether or not the calculated data size is greater than the threshold value, moving unit which moves the data written in the nonvolatile memory to the magnetic disk, when it is determined that calculated data size is greater than the threshold value, and writing section which writs the data in the nonvolatile memory.

An embodiment of the present invention will be described below with reference to accompanying drawings.

Figure 1:
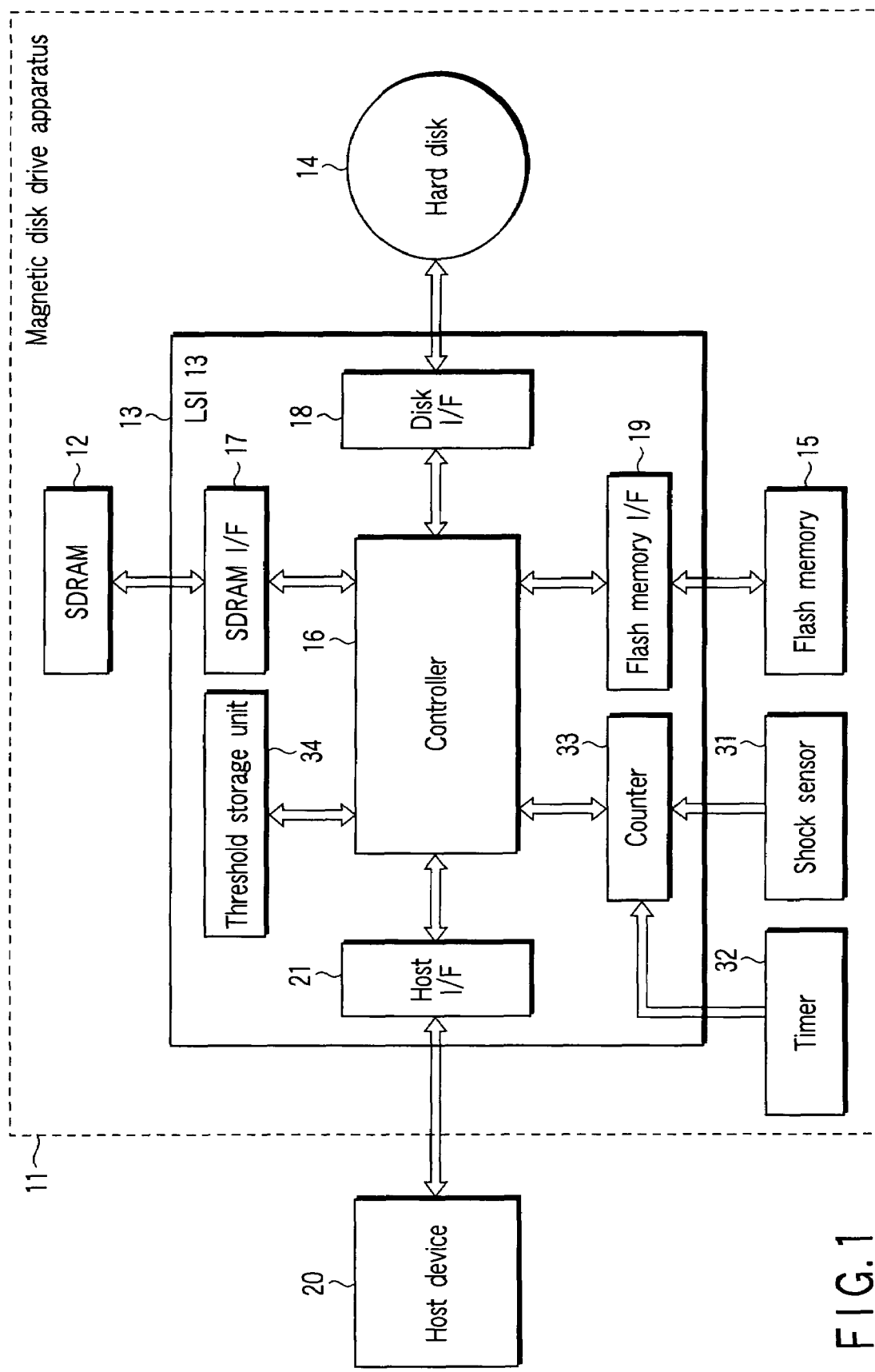
FIG. 1 is an exemplary block diagram showing a configuration of a magnetic disk drive according to an embodiment of the present invention.

FIG. 1 schematically shows a magnetic disk drive apparatus 11 described in this embodiment. As for the magnetic disk drive 11, an NV-cache applicable HDD standardized by Non Volatile Cache Command Proposal for ATA 8—ACS Revision 5 or the like is employed.

In other words, the magnetic disk drive 11 is implemented as an HDD (hybrid HDD) which comprises a nonvolatile memory as a cache. The magnetic disk drive 11 comprises an SDRAM 12 which functions as a buffer, a one-chip LSI 13 in which various kinds of circuit blocks are built, a hard disk (disk medium) 14 which is a large-capacity disk-like recording medium, a flash memory 15 which is a nonvolatile memory functioning as a cache for the hard disk 14, and the like.

The LSI 13 includes a controller 16 which serves as a control unit for conducting centralized control when the magnetic disk drive 11 executes various kinds of processing operations. The LSI 13 also includes an SDRAM I/F (interface) 17 which establishes connection between the controller 16 and the SDRAM 12 so as to enable information to be transferred therebetween, a disk I/F 18 which establishes connection between the controller 16 and the hard disk 14 so as to enable information to be transferred therebetween, a flash memory I/F 19 which establishes connection between the controller 16 and the flash memory 15 so as to enable information to be transferred therebetween, a host I/F 21 which establishes connection between the controller 16 and an external host device 20 so as to enable information to be transferred therebetween, and the like.

The host device 20 is, for example, a PC (personal computer) or the like. Upon executing predetermined application software, for example, the host device 20 can execute writing and reading of information by using the magnetic disk drive 11 and can employ the magnetic disk drive 11 as a storage of finally obtained information.

In this case, the host device 20 generates a command to require the magnetic disk drive 11 to write information and a command to require the magnetic disk drive 11 to read information. These commands are supplied to the controller 16 via the host I/F 21 and then analyzed.

The controller 16 thereby controls the SDRAM 12, the flash memory 15, the hard disk 14 and the like to selectively execute writing of the information supplied from the host device 20, reading the information for the host device 20, and the like. The controller 16 has a function of enabling the information to be transferred among the SDRAM 12, the flash memory 15 and the hard disk 14.

Basically, when the controller 16 receives a request for writing the information from the host device 20, the controller 16 urges the information which is to be written to be stored in the flash memory 15. Then, for example, when the recording area of the flash memory 15 is used to more extent than a certain level, the controller 16 transfers the information stored in the flash memory 15 to the hard disk 14 at a predetermined timing and urges the hard disk 14 to store the information.

In addition, when the controller 16 receives a request for reading the information from the host device 20, the controller 16 reads the requested information from the hard disk 14 and urges the requested information to be output to the host device 20. In this case, if the requested information exists in the flash memory 15, the controller 16 reads the information from the flash memory 15 and urges the information to be output to the host device 20.

An error-correcting code is added to the information (data) written in the flash memory 15. The data which is read from the flash memory 15 is subjected to error correction based on the error-correcting code.

An error-correcting code is also added to the information (data) recorded in the hard disk 14. The data which is read from the hard disk 14 is subjected to error correction based on the error-correcting code.

In the present embodiment, a scheme of much higher error-correcting ability is employed in the error correction to which the data recorded in the hard disk 14 is subjected, than the error correction to which the data recorded in the flash memory 15 is subjected. In other words, the reliability of the data recorded in the hard disk 14 is significantly higher than that of the data recorded in the flash memory 15.

In addition, for example, the unit of writing and reading the information, in the flash memory 15, is defined as 2 Kbytes. Moreover, the erasure unit of the flash memory 15 is defined as 128 Kbytes. In the flash memory 15, as the counts of writing and reading are increased, the elements are deteriorated and the error occurrence rate is made higher. For this reason, the writing count is limited to approximately a hundred thousand times as the information which assures the element performance.

Commands needed for description of the present embodiment, of various kinds of executable commands of the magnetic disk drive 11 as set under the above standards, are explained here. A first command designates a logic block address (LBA) and requests the information to be written in the flash memory 15.

A second command requests a recording area designated based on the LBA in the flash memory 15 to be assured as an information writing area. When the first or second command is generated from the host device 20, the controller 16 is able to write the information in the designated LBA in the flash memory 15.

Moreover, the magnetic disk drive 11 further comprises a shock sensor 31, a timer circuit 32, a counter 33 and a threshold value storing unit 34. The shock sensor 31 is a detector configured to detect shock applied to the magnetic disk drive (main body) 11 and comprises, for example, an acceleration sensor which detects an acceleration and a shock detecting unit which detects shock when the acceleration sensor detects a higher acceleration than a preset acceleration. The timer circuit 32 generates an interrupt signal (timer interrupt) at a predetermined time interval. The counter 33 executes, for example, a process of calculating the count of shock applied per unit time as detected by the shock sensor 31. The threshold value storing unit 34 stores a threshold value used for control of the execution timing of the cache flush. The threshold value is a value to define an upper limit of the size of data which can be written in the flash memory 15.

If a sum of the size of the data which has been written in the flash memory 15 and the size of the write data from host device 20 exceeds the threshold value which is set in the threshold value storing unit 34, the controller 16 executes a flush operation of moving at least a part of the data stored in the flash memory 15 to the hard disk 14, in order to secure free space in the flash memory 15. In the present embodiment, the threshold value is automatically changed on the basis of the result of detecting the shock by the shock sensor 31, in order that the flush operation is not executed as frequently as possible during the time period when shock is applied to the magnetic disk drive 11. More specifically, the controller 16 determines a threshold value which should be set in the threshold value storing unit 34 on the basis of the detection amount of the shock sensor 31, and sets the determined threshold value in the threshold value storing unit 34. For example, a threshold value which is greater than a normal threshold value is set in the threshold value storing unit 34 by the controller 16, during the time period when shock is applied to the magnetic disk drive 11. As a result, the execution timing of the flush operation can be delayed.

Figure 2:
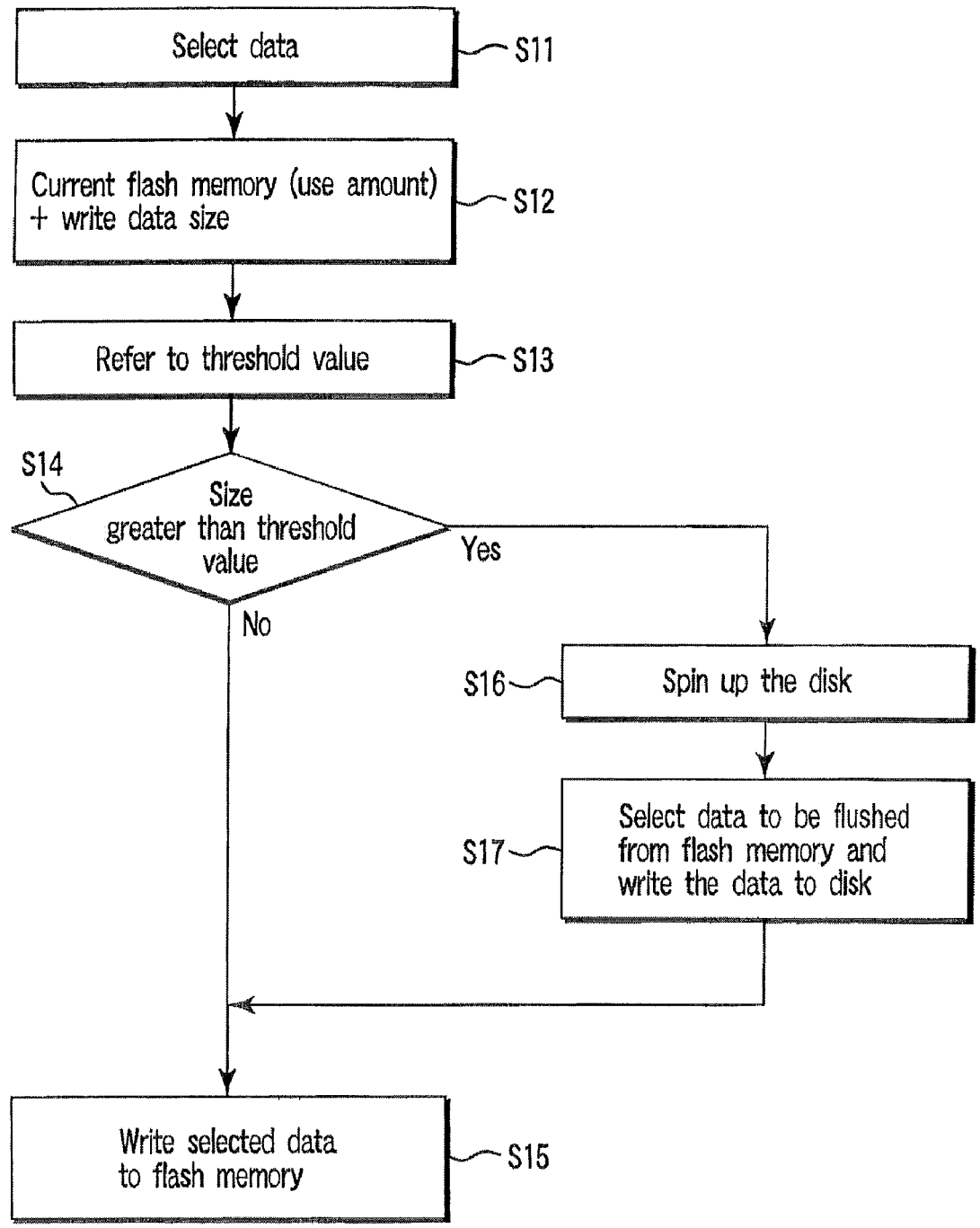
FIG. 2 is an exemplary flowchart showing steps of writing data stored in a flash memory to the disk as conducted by the magnetic disk drive according to the embodiment.

FIG. 2 is a flowchart showing steps of the flush operation.

In general, the threshold value (threshold value VT1) is preset value where there is sufficient margin to the total capacity of the flash memory 15. The threshold value VT1 is stored in the threshold value storing unit 34.

When the controller 16 receives from the host device 20 the write command to direct writing the data to the flash memory 15, the controller 16 executes the following process.

First, The write data from the flash memory 15 is stored in the SDRAM 12 serving as the buffer. The controller 16 selects the write data in the SDRAM 12 (step S11), and calculates the sum of the size of the write data and the current use amount of the flash memory 15 (i.e. the size of the data which has been written in the flash memory 15) (step S12).

The controller 16 refers to the threshold value stored in the threshold value storing unit 34 (step S13) and discriminates whether or not the calculated size is greater than the threshold value (step S14).

If the calculated size is not greater than the threshold value, the controller 16 writes the selected write data to the flash memory 15 (step S15).

On the other hand, if the calculated size is greater than the threshold value, the controller 16 starts a spin-up process of rotating the hard disk 14 (step S16), then selects the data which should be flushed from the flash memory 15, and executes the flush operation of writing the selected data in the flash memory 15 (step S17). As a result, free space is secured in the flash memory 15. In step S17, at least a part of the data in the flash memory 15 is written in the hard disk 14. Of course, all the items of data in the flash memory 15 may be written in the hard disk 14. After executing the flush operation, the controller 16 writes the selected write data in the flash memory 15 (step S15).

Figure 3:
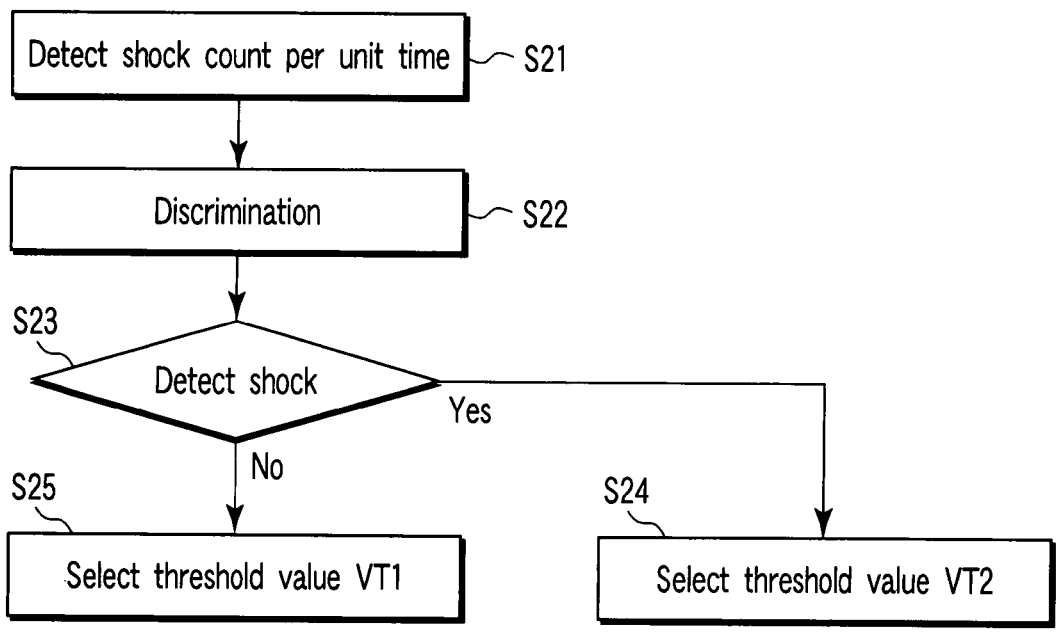
FIG. 3 is an exemplary flowchart showing an example of steps of changing threshold values as conducted by the magnetic disk drive according to the embodiment.

Next, a first example of a process of changing the threshold value is described with reference to FIG. 3.

a process of changing the threshold value with reference to timer interrupt is described. As described above, the timer 32 periodically outputs the interrupt signal at each timer interval. The shock sensor 31 generates the interrupt signal when shock sensor 31 detects shock.

By monitoring the interrupt signal from the shock sensor 31, the counter 33 counts the shock detection count at each timer interval period (unit time) and outputs the value of the shock detection count to the controller 16 as the shock detection count data (step S21).

On the basis of the data from the counter 33, the controller 16 discriminates whether or not shock is applied to the magnetic disk drive 11 (step S22). For example, when the timer interval period is 5 seconds, if the shock detection count per unit time (5 seconds) is one or more, the controller 16 determines the time period when shock is applied (YES in step S23), selects threshold value VT2 greater than the threshold value VT1, and stores the threshold value VT2 in the threshold value storing unit 34 (step S24). If the shock detection count per unit time (5 seconds) is zero, the controller 16 determines the time period when no shock is applied (NO in step S23), selects the threshold value VT1, and stores the threshold value VT1 in the threshold value storing unit 34 (step S25).

Figure 4:
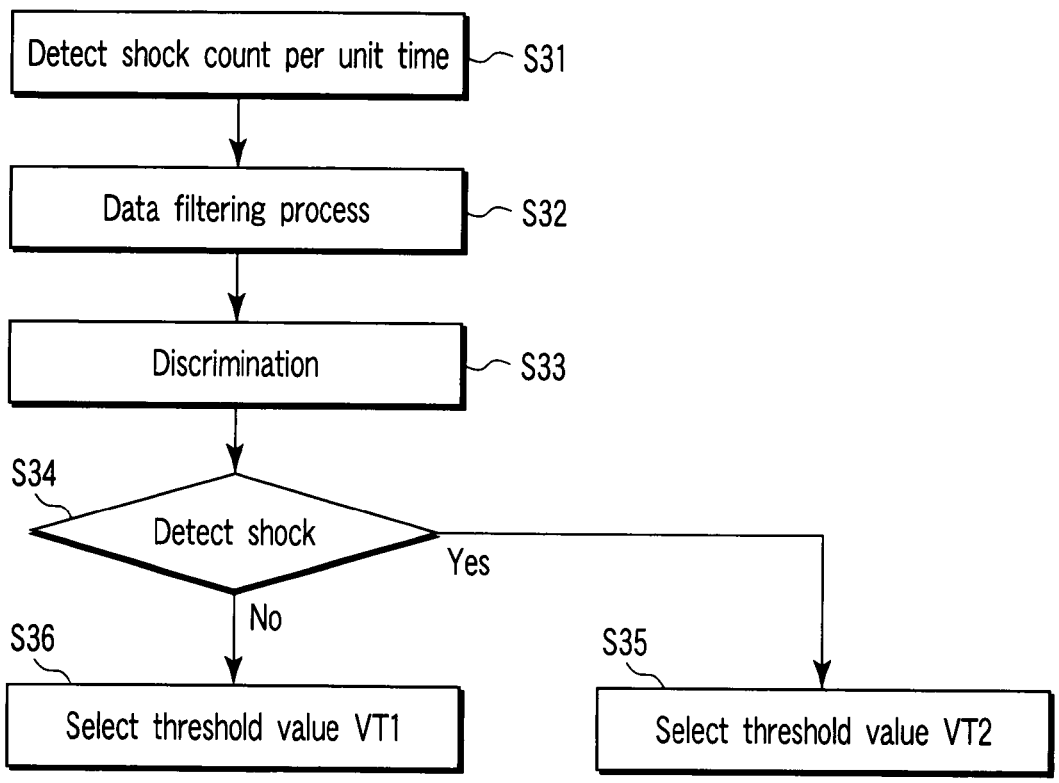
FIG. 4 is an exemplary flowchart showing another example of steps of changing threshold values as conducted by the magnetic disk drive according to the embodiment.

Next, a second example of the process of changing the threshold value is described with reference to FIG. 4.

The time period in which shock is applied is discriminated on the basis of a detection history of the shock detection count counted at the timer interval.

By monitoring the interrupt signal from the shock sensor 31, the counter 33 counts the shock detection count at each timer interval period (unit time) and outputs the value of the shock detection count to the controller 16 as the shock detection count data (step S31).

The controller 16 comprises a history register which stores the history of the shock detection count. The history register stores a plurality of items of shock detection count data corresponding to a plurality of sequential time intervals, respectively, as output from the counter 33. By executing a filtering process of averaging the plurality of items of shock detection count data, the controller 16 calculates the average shock detection count during the plurality of time interval periods (step S32).

On the basis of the calculated average shock detection count, the controller 16 discriminates whether or not shock is applied to the magnetic disk drive 11 (step S33). For example, if the average shock detection count is more than a predetermined preset count, the controller 16 discriminates the time period when shock is applied (YES in step S34), selects the threshold value VT2 greater than the threshold value VT1, and stores the threshold value VT2 in the threshold value storing unit 34 (step S35). On the other hand, if the average shock detection count is not more than the predetermined preset count, the controller 16 discriminates the time period when shock is not applied (NO in step S34), selects the threshold value VT1, and stores the threshold value VT1 in the threshold value storing unit 34 (step S36).

Incidentally, a plurality of data items representing the magnitude of the shock (i.e. magnitude of the acceleration) detected during the plural time interval periods may be stored in the history register, and the time period when shock is applied may be discriminated by using an average value of the data items.

Thus, by selecting the threshold value with the averaged count or magnitude of shock obtained by the filtering process of FIR or the like, the circumstance can be averaged and discriminated when shock is temporarily applied, and the influence from the detection of only one unexpected shock or the like can be reduced.

Figure 5:
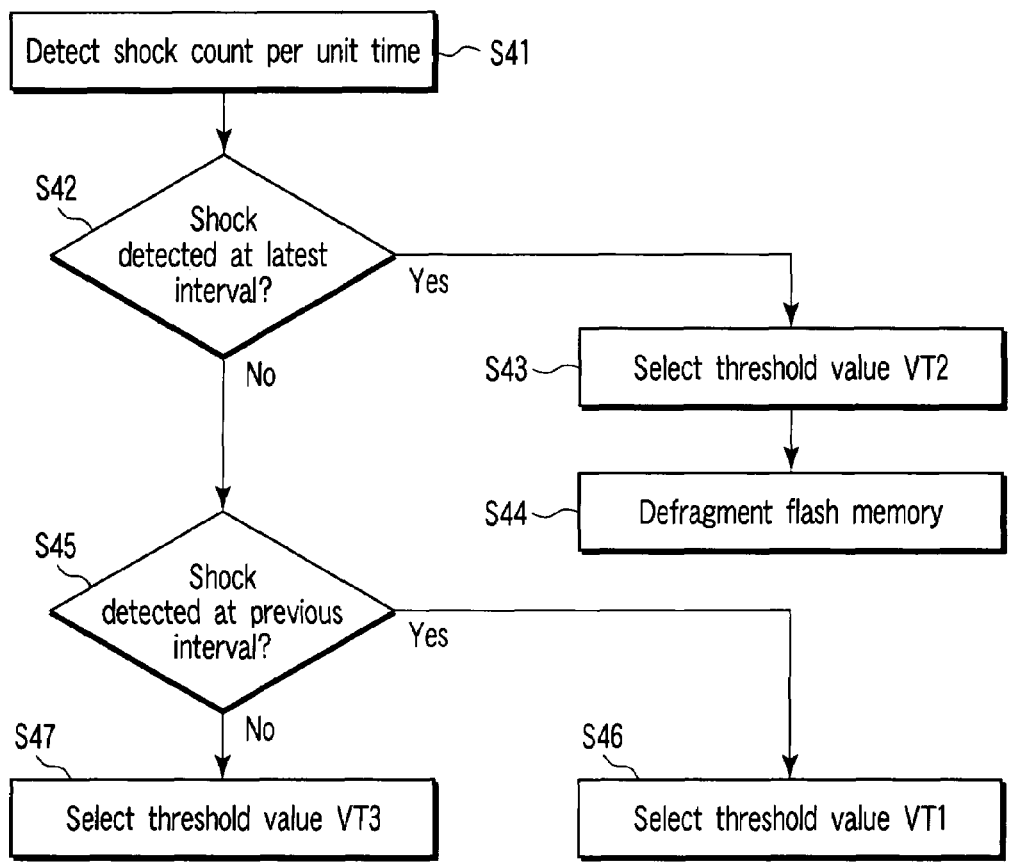
FIG. 5 is an exemplary flowchart showing still another example of steps of changing threshold values as conducted by the magnetic disk drive according to the embodiment.

Next, a third example of the process of changing the threshold value is described with reference to FIG. 5.

Figure 6:
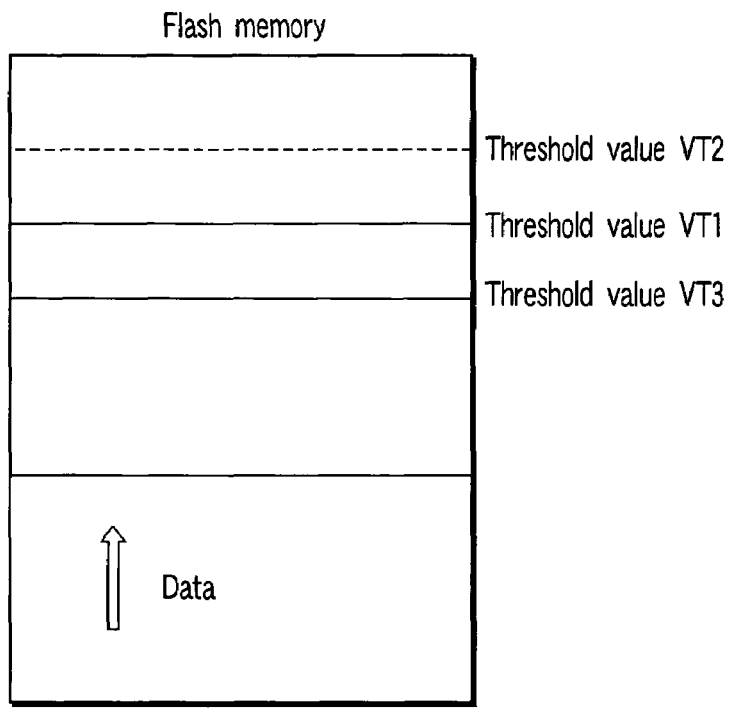
FIG. 6 is an illustration showing three threshold values used in the magnetic disk drive according to the embodiment.

Three threshold values are selectively used in accordance with the shock detection amount as shown in FIG. 6. In general, the threshold value VT1 is stored in the threshold value storing unit 34. However, if the shock detection amount is beyond a predetermined value, the threshold value VT2 greater than the threshold value VT1 is stored in the threshold value storing unit 34. If no shock is detected for a long period, threshold value VT3 smaller than the threshold value VT1 is stored in the threshold value storing unit 34.

The time period in which shock is applied is discriminated on the basis of the detection history of the shock detection count counted at the timer interval.

By monitoring the interrupt signal from the shock sensor 31, the counter 33 counts the shock detection count at each timer interval period (unit time) and outputs the value of the shock detection count to the controller 16 as the shock detection count data (step S41).

The history register of the controller 16 stores a plurality of items of shock detection count data corresponding to a plurality of sequential time intervals, respectively, as output from the counter 33.

The controller 16 discriminates whether or not the shock detection count corresponding to the latest timer interval is a predetermined count (for example, one) or more (step S42). If the shock detection count corresponding to the latest timer interval is the predetermined count or more, the controller 16 selects the threshold value VT2 and stores the threshold value VT2 in the threshold value storing unit 34 (step S43). After that, the controller 16 defragments the data stored in the flash memory 15 to increase free space in the flash memory 15 (step S44).

In general, as rewriting the data is repeated in the flash memory, a very small amount of data may often remain in some blocks and the performance efficiency may be therefore degraded. By executing the defragmentation of the flash memory, substantial free space can be increased and a synergistic effect of making the threshold values greater can also be expected.

If the shock detection count corresponding to the latest timer interval is not the predetermined count or more, the controller 16 discriminates whether or not the obtained shock detection count corresponding to an immediately previous time interval, as stored in the history register, is one or more (step S45).

If the shock detection count corresponding to the immediately previous time interval is one or more, the controller 16 selects the threshold value VT1 and stores the threshold value VT1 in the threshold value storing unit 34 (step S46). On the other hand, if the shock detection count corresponding to the immediately previous time interval is not one or more, i.e. if no shock is detected in the immediately previous time interval, the controller 16 selects the threshold value VT3 and stores the threshold value VT3 in the threshold value storing unit 34 (step S47).

In addition, if shock is detected, a process of decreasing the data amount written in a disk at one access may be executed, besides the process of changing the threshold values.

According to the present embodiment, as described above, by making the threshold value changeable in accordance with the detection conditions of the shock sensor 31, the threshold value can be made greater, the timing of the Disk access can be delayed and the period in which the head is on the medium can be shortened when shock is detected. The possibility of physical breakage caused by external vibration can be thereby reduced.

In addition, if shock is detected, the advantages can be further increased by making the substantial free space greater by the defragmentation in the flash memory and by making the writing size at one Disk access smaller.

If shock is not detected, the data is written as soon as possible since the hard disk is considered to be in a stable state. After that, when shock is applied, the hard disk can be set in a state in which a small amount of data remains in the Flash memory.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic disk drive apparatus, comprising:
a detector which detects shock applied to a main body of the magnetic disk drive;
a magnetic disk which records data;
a nonvolatile memory which serves as a cache memory when data is recorded in the magnetic disk;
a threshold value setting unit which sets a threshold value of a storable size of the nonvolatile memory in accordance with count of the shock detected by the detector;
addition unit which calculates a sum of a size of data which has been written in the nonvolatile memory and a size of data to be written in accordance with the write command, when a write command of data to the nonvolatile memory is input;
determination section which determines whether or not the calculated data size is greater than the threshold value set by the threshold value setting unit;
moving unit which moves the data written in the nonvolatile memory to the magnetic disk, when it is determined that calculated data size is greater than the threshold value; and
writing section which writs the data based on the write command in the nonvolatile memory after the moving unit moves the data.

2. The magnetic disk drive apparatus according to claim 1, wherein the threshold value setting unit sets a first threshold value as the threshold value when the count of the shock detected per unit time by the detector is not more than a preset count, and the threshold value setting unit sets a second threshold value greater than the first threshold value as the threshold value when the count of the shock detected per unit time is more than the preset count.

3. The magnetic disk drive apparatus according to claim 1, wherein
the detector comprises an acceleration sensor which detects an acceleration, and a shock detecting unit which detects shock when the acceleration sensor detects an acceleration greater than a preset acceleration;
the magnetic disk drive further comprises a history storing unit which stores a history of magnitude of the acceleration when the detector detects the shock, and average obtaining unit which obtains a shock count averaged based on the history stored in the history storing unit; and
the threshold value setting unit sets a first threshold value as the threshold value when the averaged shock count is not more than a preset count, and the threshold value setting unit sets a second threshold value greater than the first threshold value as the threshold value when the averaged shock count is more than the preset count.

4. The magnetic disk drive apparatus according to claim 1, wherein
the magnetic disk drive further comprises a history storing unit which stores a history of a shock count detected per unit time by the detector; and
the threshold value setting unit discriminates whether or not shock has been detected in the history storing unit in a case where the count of the shock detected by the detector is not more than the preset count, the threshold value setting unit sets a first threshold value when it is discriminated that the shock has been detected in the history storing unit, the threshold value setting unit sets a second threshold value greater than the first threshold value as the threshold value when the count of the shock detected by the detector is more than the preset count, and the threshold value setting unit sets a third threshold value smaller than the first threshold value as the threshold value when the shock has not been detected in the history storing unit.

5. The magnetic disk drive apparatus according to claim 4, further comprising defragmenting unit which defragments the data stored in the nonvolatile memory after the threshold value setting unit sets the first threshold value.

6. A method of controlling a magnetic disk drive apparatus, comprising a detector configured to detect shock applied to a main body of the magnetic disk drive, a magnetic disk configured to record data; and a nonvolatile memory configured to serve as a cache memory when data is recorded in the magnetic disk,
the method comprising:
setting a threshold value of a storable size of the nonvolatile memory in accordance with count of the shock detected by the detector;
calculating a sum of a size of data which has been written in the nonvolatile memory and a size of data to be written in accordance with the write command, when a write command of data to the nonvolatile memory is input;
discriminating whether or not the calculated data size is greater than the threshold value set by the threshold value setting unit;
moving the data written in the nonvolatile memory to the magnetic disk, when it is discriminated that calculated data size is greater than the threshold value; and
writing the data based on the write command in the nonvolatile memory after the moving unit moves the data.

7. The method according to claim 6, wherein a first threshold value is set as the threshold value when the count of the shock detected per unit time by the detector is not more than a preset count, and a second threshold value greater than the first threshold value is set as the threshold value when the count of the shock detected per unit time is more than the preset count.

8. The method according to claim 6, wherein
   the detector comprises an acceleration sensor configured to detect an acceleration, and a shock detecting unit configured to detect shock when the acceleration sensor detects an acceleration greater than a preset acceleration;
   a history of magnitude of the acceleration obtained when the detector detects the shock is stored;
   a shock count averaged based on the stored history is obtained; and
   a first threshold value is set as the threshold value when the averaged shock count is not more than a preset count, and a second threshold value greater than the first threshold value is set as the threshold value when the averaged shock count is more than the preset count.

9. The method according to claim 6, wherein
   a history of a shock count detected per unit time by the detector is stored;
   it is discriminated whether or not shock has been detected in a case where the count of the shock detected by the detector is not more than the preset count;
   a first threshold value is set when it is discriminated that the shock has been detected;
   a second threshold value greater than the first threshold value is set as the threshold value when the count of the shock detected by the detector is more than the preset count; and
   a third threshold value smaller than the first threshold value is set as the threshold value when the shock has not been detected.

10. The method according to claim 7, wherein the data stored in the nonvolatile memory is defragmented after the first threshold value is set.

* * * * *